T. P. CHEEVERS.
ARM FITTING.
APPLICATION FILED AUG. 2, 1919.

1,384,826.

Patented July 19, 1921.

Inventor
Thomas P. Cheevers

By Whittemore Hulbert & Whittemore,
Attorneys

UNITED STATES PATENT OFFICE.

THOMAS P. CHEEVERS, OF DETROIT, MICHIGAN.

ARM-FITTING.

1,384,826.   Specification of Letters Patent.   Patented July 19, 1921.

Application filed August 2, 1919. Serial No. 314,948.

*To all whom it may concern:*

Be it known that I, THOMAS P. CHEEVERS, a citizen of the United States of America, residing at Detroit, in the county of Wayne and State of Michigan, have invented certain new and useful Improvements in Arm-Fittings, of which the following is a specification, reference being had therein to the accompanying drawings.

The invention relates to display figures and refers particularly to arm fittings. The invention has for one of its objects the provision of a construction for facilitating the dressing and draping of a display figure and for permitting of adjusting the arms to effect any desired pose. Another object is to provide a construction in which the arms are detachably connected to the shoulder of the figure and may be manually moved to the desired positions, means being provided for firmly holding the arms in any of the adjustable positions. A further object is the provision of a construction which will permit the interchange of different forms of arms on the same body of a display figure. Other objects of the invention reside in the novel arrangements and combinations of parts as more fully hereinafter set forth.

Figure 1:
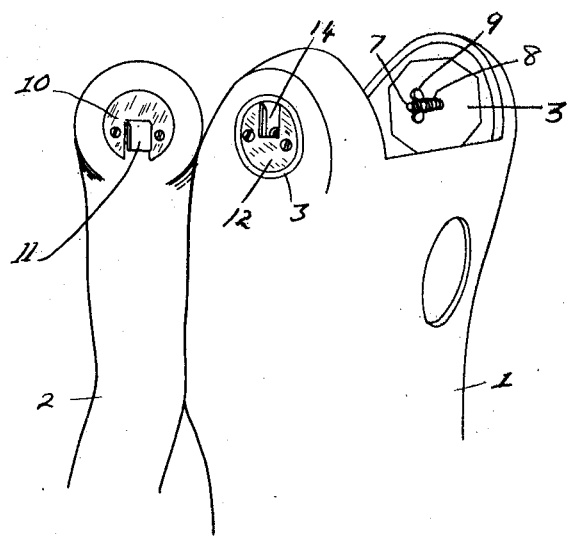
Figure 1 is a perspective view of a portion of a display figure with an arm detached.
Figure 2:
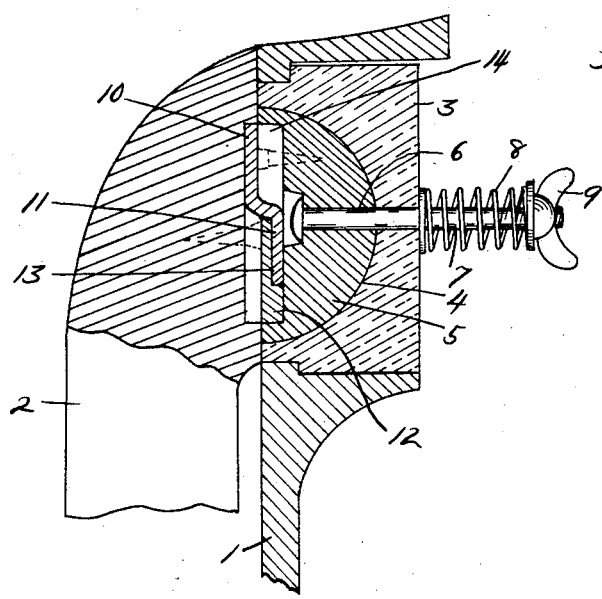
Fig. 2 is a cross section through a shoulder of a display figure with an arm attached.

1 is a display figure and 2 an arm. 3 is a plug, preferably formed of wood, fitting in the shoulder of the display Fig. 1 and having the spherical or half ball socket 4 in its outer face. 5 is a half ball member, preferably formed of wood, fitting in the socket 4 and provided with the central radially extending bore 6 through which extends the bolt 7, which bolt also extends through the plug 3.

For providing yieldable frictional engagement between the half ball member 5 and the socket 4 the spring 8, having convolutions of the same diameter, is provided coiled about the inner end of the bolt 7, one end of this spring abutting against the inner face of the plug 3, and the other against a suitable tensioning means 9, such as a wing nut and washer upon the bolt 7. By rotating this wing nut the tension of the spring can be adjusted so that when the half ball member 5 is rotated in the socket 4 it will be held in its adjusted position.

The arm 2 is provided with the plate 10 which has the central downwardly extending tongue 11 offset from the body of the plate and extending substantially parallel thereto. Secured in the outer face of the half ball member 5 is the plate 12 which has the lower vertical recess 13 on its rear side and the opening 14 above and leading to the recess. The tongue 11 is adapted to be readily inserted through the aperture 14 into engagement with the recess 13 to secure the arm 2 to the half ball member 5.

The arm 2, as shown in the drawings, is a full wax arm, but it is evident that a modeled shoulder upper one-half arm, formed of wood, papier mâché, or other suitable material can be as readily used.

By removing the half-ball member 5, it is possible to use the common full ball one-half arm since the ball of this arm can be placed in engagement with the spherical socket 4 in the plug 3 and can be secured in place by suitable means, such as the bolt, coil spring and tensioning means similar to that shown in the drawings.

From the above description it will be seen that different forms of arms can be used with the same display figure, such as half length and full length arms, having means for detachably engaging a spring pressed half ball in the shoulder portion of the figure. Furthermore, the construction is such that still another form of arm can be used, such as one having a ball at its upper end, which ball can be engaged in the socket of the plug when the half ball is removed. By reason of having coöperating spherical surfaces due to the half ball engaging in the spherical socket of the plug, the friction can be readily adjusted so that the half ball, when rotated by the arm, can be maintained in its adjusted position. Furthermore, the tension can be such that the arm will not be damaged or broken in rotating the half ball. Another important consideration is, that by having the detachable engagement between arm and shoulder portion of the figure, the dressing and draping of the figure is facilitated, since during the operation the arm can be detached from the shoulder portion and later added and adjusted to the desired position.

Although I have described the arm as having a detachable engagement with a half ball it is to be understood that the latter may vary from a half ball in size. Furthermore, the device will operate without the necessity of the spherical surface of the half ball completely engaging the spherical surface of the socket.

What I claim as my invention is:

1. An arm fitting for display figures comprising a spring pressed half ball rotatably mounted on a shoulder of a figure, an arm and means detachably connecting said arm and half ball with each other, said arm being adapted to turn said half ball on swinging said arm up or down, and said half ball holding said arm in adjusted position.

2. An arm fitting for display figures comprising a plug mounted on a shoulder of a figure and having a half ball recess therein, a half ball rotatably engaging in said recess, means for yieldably retaining said half ball in engagement with said recess, an arm and plates on said arm and half ball detachably connected to each other.

3. In an arm fitting for display figures, the combination with a plug mounted in a figure and having a half ball socket in its outer face, of a half ball rotatably engaging in said socket, a spring for yieldably maintaining the spherical surfaces of said half ball and socket in contact with each other, an arm, and a hook connection between said arm and half ball for detachably securing said arm to said half ball.

4. In an arm fitting for display figures, the combination with a spring pressed half ball rotatably mounted on a shoulder of a figure, of an arm, an apertured plate secured to said half ball, and another plate secured to said arm and provided with a hook detachably engaging said first mentioned plate through its aperture.

5. An arm fitting for display figures, comprising a half ball adjustably rotatably engaging in a spherical recess in a shoulder of a figure, means for retaining said half ball in frictional engagement with the recess and in its positions of rotative adjustment, an arm and coöperating members upon said arm and half ball for detachably securing said arm to said half ball.

In testimony whereof I affix my signature.

THOMAS P. CHEEVERS.